Dec. 16, 1969   M. WISMER ET AL   3,484,335
LAMINATED ARTICLES CONTAINING OXIDATIVELY CURED NON-RUBBERY
INTERPOLYMERS AND METHOD FOR MAKING
Filed July 19, 1965

INVENTOR
MARCO WISMER and
PAUL J. PRUCNAL

BY
Chisholm and Spencer
ATTORNEYS

United States Patent Office 3,484,335
Patented Dec. 16, 1969

3,484,335
LAMINATED ARTICLES CONTAINING OXIDATIVELY CURED NON-RUBBERY INTERPOLYMERS AND METHOD FOR MAKING
Marco Wismer, Gibsonia, and Paul John Prucnal, Cheswick, Pa., assignors to PPG Industries, Inc., Pittsburgh, Pa., a corporation of Pennsylvania
Filed July 19, 1965, Ser. No. 473,146
Int. Cl. B32b *3/26, 17/10*
U.S. Cl. 161—160          35 Claims

ABSTRACT OF THE DISCLOSURE

This invention relates to laminates in which the bonding agent is a cured, non-rubbery interpolymer of a cyclic polyene and one or more monoolefins, said interpolymer having a substantially saturated carbon chain containing a substantial proportion of the total carbon atoms in the polymer molecule and having prior to curing sufficient ethylenically unsaturated groups in the polymer molecule to permit substantial curing of films thereof by an oxidative mechanism and an intrinsic viscosity of 0.6 or lower, and to methods of bonding whereby such laminates are obtained.

---

Interpolymers of ethylene, propylene and similar ethylenic hydrocarbons containing small amounts of interpolymerized polyunsaturated compounds are of increasing commercial interest. For the most part, such interpolymers as known heretofore are elastomers characterized by their rubbery properties, and in common with conventional rubbers, are only curable by vulcanization, generally utilizing sulfur as the vulcanizing agent.

Recently, interpolymers of ethlyenic hydrocarbons and polyunsaturated compounds have been found which can be cured by an oxidative mechanism and which can be employed in coating compositions applied by conventional means to provide cured coating of highly desirable properties. Curable interpolymers of this type are disclosed in copending applications Ser. No. 413,326, filed Nov. 23, 1964; Ser. No. 460,544, filed June 1, 1965; and others. These interpolymers contain a substantial proportion of a polyunsaturated hydrocarbon, preferably having nonconjugated ethylenic groups, interpolymerized with at least one monoolefin having a single copolymerizable ethlyenic group, and are obtained by polymerization in the presence of a transition metal catalyst.

It has now been discovered that these interpolymers can be employed as bonding agents to bond together a wide variety of laminae, to provide laminates of outstanding strength and having other desirable properties. In bonding with these interpolymers, their curing can be carried out entirely with atmospheric oxygen, or curing can be carried out with an added curing agent, if desired, after oxidative curing is partially or wholly complete. This latter method is particularly effective in bonding rubber, with the added curing agent being a vulcanizing agent for the rubber. Bonding by curing the interpolymer with atmospheric oxygen while in contact with the laminae is especially useful when one or more of the laminae is permeable to air, or when the laminate has a thin glue line with exposed edges. The laminates obtained have excellent properties and can be employed for many purposes.

Figure 1:
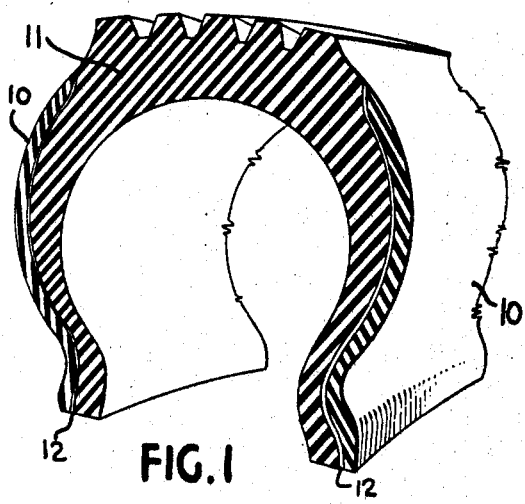
Figure 2:
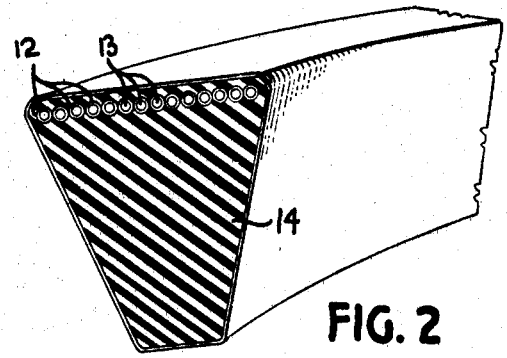
Figure 4:
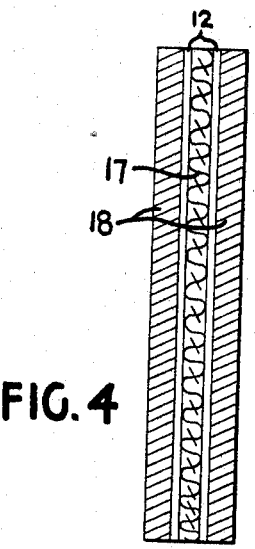
Figure 3:
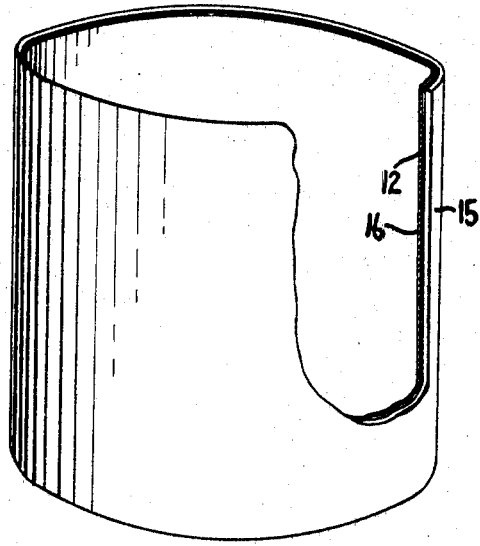
Figure 5:
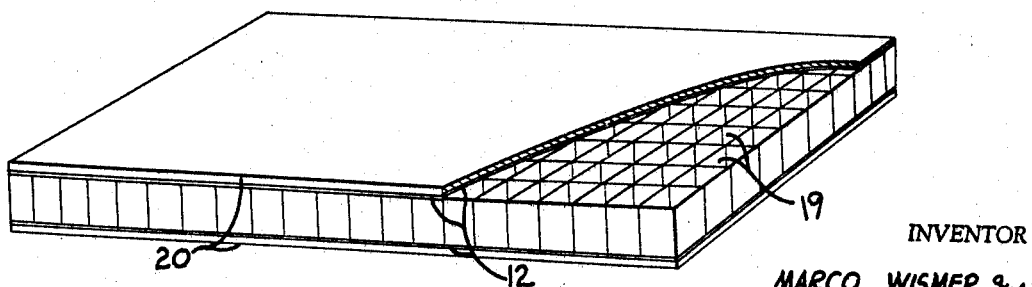

The attached drawings illustrate several laminates which can be produced in accordance with the invention. FIGURE 1 is a section of a tire made of two dissimilar rubbers. FIGURE 2 is a section of V-belt containing glass fiber reinforcement. FIGURE 3 is a cutaway view of the side of a laminated paper-to-foil composite container. FIGURE 4 is a sandwich panel of a glass fiber cloth inner member between two metal outer members. FIGURE 5 is a cutaway view of a metal-skinned paper honeycomb panel.

In the aforementioned drawings, the tire of FIGURE 1 is made up of a sidewall 10 made of one type of rubber (for example, an EPT rubber as hereinafter described) bonded to the tire carcass 11, made of a different type of rubber, through an interlayer 12 made of an interpolymer as disclosed herein. In FIGURE 2, reinforcing glass fibers 13 are embedded in a rubber belt 14 and bonded thereto through interlayer 12. The container of FIGURE 3 comprises a paper outer skin 15 bonded to a foil inner skin 16 through the adhesive interlayer 12. In the panel shown in FIGURE 4, the adhesive interlayer 12 inpregnates a glass fiber cloth 17 and bonds it to two metal sheets 18. The honeycomb panel of FIGURE 5 has a paper honeycomb 19 bonded to metal sheets 20 through interlayer 12.

The interpolymers employed in the present invention are characterized by several properties which distinguish them from the rubbery polymers made from dienes and monoolefins. These include the following:

(1) The interpolymers employed herein contain a comparatively high degree of functional unsaturation, which permits them to be substantially cured by an oxidative mechanism. Substantial curing by oxidative mechanism means that a thin film of the material upon exposure to air cures sufficiently to become tack-free and essentially insoluble in aliphatic hydrocarbons, such as heptane. The interpolymers cure by autooxidation, absorbing oxygen from the air to build up a cross-linked structure. While curing may continue for days, or even weeks, sufficient curing to achieve a tack-free state takes place within a reasonable time, 24 hours at ordinary room temperature being usually taken as indicative.

The temperature of curing can vary; the preferred interpolymers substantially cure at ambient temperatures, and in any event below 100° F., but desirable materials can be produced which require somewhat higher curing temperatures, although in all cases the cure mechanism is predominantly oxidative. It is to be understood that the curing characteristics above serve to define the interpolymers herein but do not limit the possible methods of curing that can be used; for example, driers such as metal naphthenates can be employed to accelerate the cure, or a high oxygen atmosphere and higher temperatures than the minimum necessary can be used for the same purpose. Cross-linking agents can also be added, or cure can be induced by ultra-violet or other radiation, with or without the presence of photosensitizers, such as benzophenones.

The interpolymers utilized in accordance with this invention contain at least about 2 weight percent unsaturation, as defined below, and preferably contain 2.5 percent or more, with at least about 3 percent being desirable when oxidative curing is employed. They may have up to about 25 weight percent unsaturation or even more.

(2) As indicated, the curing properties of these interpolymers differ from that of the rubbery polymers, and the extent of cross-linking thereby achieved is much higher. Whereas the rubbery polymers have a very low cross-link density, and require a vulcanizing agent to achieve that, films of the present interpolymers, contrastingly, dry in air without an added curing agent.

(3) The interpolymers herein are of lower molecular weight than are the rubbery polymers, as indicated by their lower intrinsic viscosity. Thus, the intrinsic viscosity of the known rubbery polymers is at least 1.0, and usually 1.5 or higher, corresponding to a molecular weight of 50,000 or more. This is considerably higher than the intrinsic viscosity of the present interpolymers, which preferably have an intrinsic viscosity no higher than about 0.9, and usually 0.6 or lower.

Intrinsic viscosity is described, for example, in the book by Allen entitled "Techniques of Polymer Characterization," Butterworth Publications, Ltd., London, 1959; the values herein being measured in benzene at 25° C., using an Ubbelohde Dilution Viscometer.

(4) The present interpolymers are much more soluble in organic solvents than are the aforesaid rubbery polymers, permitting them to be dissolved in appreciable concentrations while maintaining a usable solution viscosity. For example, the preferred interpolymers have a Gardner-Holdt viscosity of Z or lower at 20 percent solids concentration in aromatic naphtha (e.g., Solvesso 100) or xylene, and can be applied from solvent-based compositions that have desirable application properties. There can be obtained solutions of the present interpolymers in benzene, xylene, aromatic naphtha or other solvents containing as much as 70 percent or more resin solids and having a utilizable viscosity, whereas solutions of the rubbery polymers containing only about 10 to 15 percent solids are usually completely unworkable.

Many of the properties of these interpolymers are attributable in large part to their structures, which includes an essentially saturated carbon chain as the polymer backbone, this chain containing a substantial proportion (i.e., 20 percent or more) of the total carbon atoms in the polymer molecule. Only a small amount of ethylenic unsaturation is in the polymer backbone, principally in terminal position, with at least a major part of the unsaturated linkages remaining in the polymer molecules being in pendent groups attached to the main polymer chain.

The extent of unsaturation is sufficient to permit curing by oxidative mechanism, which in general requires at least about 2 percent by weight of unsaturation in the polymer. "Percent by weight of unsaturation," as employed herein refers to the weight of groups of the structure

compared to the total weight of interpolymer. For instance, 2 percent by weight of unsaturation means each 100 grams of interpolymer contain 2 grams of carbon present in groups of the structure

Accurate determination of the extent of unsaturation in these products by common analytical techniques is quite difficult. For example, ordinary iodine value determinations have been found to be unreliable, and accurate analysis by chemical means in general requires very tedious and time-consumnig procedures. One method which can be used is infra-red spectroscopic examination, in which the quantitative extent of unsaturation is determined by comparing the characteristic peak obtained from the interpolymer with that of a known material of similar structure and previously determined unsaturation level. Another method for determining the extent of unsaturation is by means of nuclear magnetic resonance spectroscopy, as described in the foregoing copending applications.

Because the reactivity of the interpolymers herein is such that small but significant amounts of unsaturation may be lost by oxidation or other reaction, handling and exposure of samples used for analysis should be minimized. Otherwise, low values may be obtained on analysis. For this reason, it is usually better to rely on the curing characteristics as indicative of the necessary extent of unsaturation, with numerical values being used chiefly for comparison of samples handled similarly.

The proportions of the components of the interpolymer can be varied widely, it being necessary only to interpolymerize sufficient polyunsaturated hydrocarbon with the monoolefin or monoolefins to provide the desired level of unsaturation in the polymer, this amount varying with the particular polyunsaturated compound. For instance, there should be interpolymerized along with the monoolefin or monoolefins at least about 11 percent of dicyclopentadiene or similar diene.

Among the polyunsaturated compounds that can be employed in producing the interpolymers described herein are various dienes and other polyenes. Dienes containing non-conjugated ethylenic groups, and to a lesser extent conjugated alicyclic dienes, are preferred. Included among the polyunsaturated compounds that can be employed are cyclic polyenes such as cycloalkadienes; substituted norbornenes, e.g., 5-alkenyl-2-norbornenes; norbornadiene (bicyclo[2.2.1]hepta-2,5-diene) and substituted norbornadienes, e.g., 2-alkyl norbornadienes; unsaturated terpenes, such as limonenes; and similar compounds. The polyene may contain substituents, such as halogen or oxygen-containing radicals, but in general it is preferred to employ unsubsituted hydrocarbons containing only carbon and hydrogen. Certain dienes exert a marked influence in lowering molecular weight, even when present only in very small amount. Norbornadiene and 4-vinylcyclohexene-1 have this effect and they are preferably included in the polyunsaturated hydrocarbon component when low molecular weight products are especially desired.

Some representative examples of specific polyunsaturated compounds that can be utilized are:

1,4-pentadiene
1,9-decadiene
3,3-dimethyl-1,5-hexadiene
1,4-hexadiene
1,9-octadecadiene
6-methyl-1,5-heptadiene
7-methyl-1,6-octadiene
11-ethyl-1,1-tridecadiene
1,3-cyclopentadiene
1,3-cyclooctadiene
5-methyl-1,3-cyclopentadiene
1-methyl-3-isopropyl-1,3-cyclopentadiene
dicyclopentadiene
tricyclopentadiene
5-methyl-1,3-cyclopentadiene dimer
2-methyl-4-ethyl-1,3-cyclopentadiene dimer
1,4-cyclohexadiene
1,5-cyclooctadiene
1,5-cyclododecadiene
1,5,9-cyclododecatriene
1,4,6-cyclooctatriene
5-(2'-butenyl)-2-norbornene
5-(2'-ethyl-2'-butenyl)-2-norbornene
5-(1,5-propenyl)-2-norbornene
5-(2'-heptyl-1'-undecenyl)-2-norbornene
5-(2'-propyl-2'-pentenyl)-2-norbornene
5-methylene-2-norbornene
bicyclo[2.2.1]hepta-2,5-diene
2-methyl norbornadiene
2-ethyl norbornadiene
2-isopropyl norbornadiene
2-heptyl norbornadiene
1,8(2)-p-menthadiene
divinylbenzene
5-vinylbicyclo[2.2.1]hept-2-ene
bicyclo[4.3.0]nona-3,7-diene Generally speaking, any monoolefin having a single copolymerizable ethylenic group can be interpolymerized with the polyene. Laminates satisfactory for many purposes can be made from interpolymers of the polyunsaturated compound with only a single monoolefin, e.g., copolymers of ethylene and dicyclopentadiene, or propylene and dicyclopentadienes. For other purposes, it is preferred to employ interpolymers of at least two comonomers with the polyunsaturated compound. In either event, it is preferred that ethylene comprise a substantial proportion of the interpolymer, i.e., at least about 20 percent by weight. Classes of preferred interpolymers include copolymers of a non-conjugated diene and ethylene, and interpolymers of a nonconjugated diene, ethylene, and at least one other monoolefin having a single terminal ethylenic group.

Of the large number of usable monoolefins, the preferred comonomers include those having the formula

where R is alkyl having, for example, up to about 20 carbon atoms, or aryl, and R' is hydrogen or alkyl of up to about 20 carbon atoms. Compounds of this class include propylene, 2-methylpropene, 2-propylhexene-1, 1-butene, 4-methyl-1-pentene, 1-pentene, 1-hexene, 1-octane, 5-methyl-1-nonene, 5,6,6-trimethyl-1-decene, 1-dodecene, 1-tetradecene, 1-octadecene, styrene and vinyl toluene.

When two or more comonomers are utilized, their proportions are not critical since, as mentioned, copolymers of a single monoolefin with the polyunsaturated compound can be employed. The preferred proportions vary depending on the identity of the particular monomers. For example, interpolymers of ethylene, propylene, and a nonconjugated diene, usually dicyclopentadiene, generally contain from about 10 percent to about 70 percent of ethylene, from about 10 percent to about 40 percent of propylene, and from about 5 percent to about 50 percent of the diene, while preferred copolymers contain from about 20 percent to about 90 percent of ethylene and from about 10 percent to about 80 percent of a diene such as dicyclopentadiene. It will be understood that the minimum usable amount of any diene depends to some extent upon its molecular weight. (The above percentages are by weight; the same is true of all parts and percentages throughout this specification unless otherwise specified.)

The interpolymerization of the foregoing monomers is carried out in the presence of a transition metal catalyst of the Ziegler type; examples of Ziegler catalysts (sometimes called Ziegler-Natta catalysts) are described in U.S. Patents Nos. 3,159,615; 3,153,023; 3,159,615; 3,168,504; and others. They generally involve interaction products of an alkyl aluminum compound and a transition metal compound. In making the interpolymers herein a preferred catalyst is composed of an organic vanadium compound and an alkyl aluminum halide, with the organic vanadium compound being usually vanadium tris-(acetylacetonate) or vanadium oxybis(acetylacetonate). The alkyl aluminum halide cocatalyst is typically ethyl aluminum sesquichloride. Other catalyst systems can also be utilized.

In carrying out the interpolymerization there is employed a liquid reaction medium, which can be an organic solvent or one of the reactants in liquid form. Purified benzene, xylene, toluene, chlorobenzene, or a similar aromatic solvent is generally utilized, although other solvents can be employed. For efficient operation, care should be taken to exclude oxygen and moisture. The temperature is maintained at room temperature or preferably below, e.g., 20° C. or lower, with temperatures as low as −80° C. or lower being advantageously utilized. The catalyst and reactants can all be added initially, or one or more can be added continuously or incrementally. Gaseous reactants are generally fed to the reaction vessel as the polymerization progresses, maintaining saturation of the mixture.

Atmospheric pressure can be utilized in carrying out the interpolymerization reaction, as can elevated pressures up to 1000 atmospheres or more. At the end of the polymerization, residual catalyst can be removed if desired by washing the reaction mixture with water or acid. If desired, part of the solvent can be distilled off along with unreacted polyene or other reactants, and these can be recovered or recycled.

Essentially any lamina can be employed in making laminates with the foregoing interpolymers, as described herein. Among the materials that can be utilized are various metal laminae, including steel, aluminum, stainless steel, anodized aluminum, etched aluminum, zinc coated steel, and the like; siliceous, calcareous or other inorganic laminae, such as glass, porcelain, asbestos, ceramics, concrete, cement-asbestos board, perlite, vermiculite, and similar materials; plastic laminae, including filled or unfilled, naturally-occurring or synthetic materials such as linoleum, rubber, polyester, acrylic resins, phenolic resins, aminoplast resins, epoxy resins, alkyd resins, as well as surfaces coated with such materials; cellulose-containing laminae, such as wood, fiber board, hardboard and similar wood materials, as well as paper and paper products, such as paper sheets and honeycomb and resin-impregnated paper honeycomb; foams made of the above or other materials, such as foamed or cellular glass, foamed rubber, polyurethane foams, polyester foams, epoxy foams, cellular ceramics, and the like; and fiber or fabrics (woven or non-woven) made from the above or other materials, such as fibers of glass, cotton, nylon, wool, polyesters and the like.

The present bonding agents are extremely versatile and are especially desirable in bonding several types of materials some of which are difficult to bond satisfactorily with known adhesives. These include:

(a) Rubber, either natural or synthetic and either as rubber stock or as rubber foam. Extremely good adhesion is obtained with the bonding agents herein, especially with styrene-butadiene rubber (SBR), ethylene-propylene copolymer rubber (EPR) and ethylene-propylenediene terpolymer rubber (EPT). Rubber laminates are used in tires, belting, rubber-coated fabrics, etc.

(b) Glass, both flat glass, cellular glass, and glass fibers, woven or non-woven. Bonding of materials to glass in making architectural glass structures, and reinforcing with glass fibers or glass cloth are examples of such laminates.

(c) Paper, and particularly paper honeycomb, as is employed in making, for example, metal skinned panels for buildings or aircraft.

(d) Organic foams, both rigid and flexible, such as polyurethane foams, polystyrene foams, polyester foams, epoxy foams, polyolefin foams and the like. These are well known and are used in furniture, weatherstripping, and many other applications.

(e) Metals, including especially aluminum and steel; metal laminates provide protective or structural members, metal mesh reinforced products, and many other such laminated articles.

One of the outstanding and unique attributes of the interpolymers employed herein is their ability to bond both to hydrophobic surfaces such as rubber, and to polar surfaces such as metal or glass. Because of the excellent adhesion obtained to varying substrates by the same interpolymer composition (this not being true with many bonding materials), certain laminates made in accordance with the invention are of particular interest and utility. Some laminates of special interest are:

(1) Rubber to glass laminates, particularly where the glass is in the form of fibers or glass cloth. Such laminates may contain several layers of rubber, which can be of the same or different types, with strands of glass fibers disposed in the rubber as a reinforcement, or with a glass layer interposed between the rubber plies as a reinforcing material. Other embodiments include adhering rubber foam to glass plates or panels.

(2) Rubber to metal laminates, as where rubber foam is adhered to a metal frame or opening as cushioning or insulation, or where protective or insulating rubber coatings are applied to metal.

(3) Rubber to rubber laminates, in which the same or different types or rubber are bonded together. For example, when SBR rubber is bonded to EPT rubber in accordance with the invention, the laminate obtained is virtually impossible to separate up to the elastic limit of the rubber itself. Such laminates are useful in articles, such as tires, in which various parts are subject to different conditions in service; the particular advantages of the different types of rubber can thus be utilized.

(4) Paper or plastics to glass or metal, as in signs, labels, foil-paper composite containers, metal skinned paper or plasic honeycomb panels, and similar articles.

(5) Metal to metal laminates, either with only the interpolymer between the metal layers or with material such as a foam, glass cloth or the like interposed between the metal and serving as a carrier for the interlayer.

Various techniques can be employed to produce the laminate herein, depending upon the nature of the laminae and the structure, shape and desired properties of the laminate. Several bonding methods are described below, although it is to be understood that variations and combinations of these methods can be utilized, as can other methods adapted to the particular materials and apparatus available.

In general, the bonding methods employed comprise the curing of the interpolymer while in contact with one or more of the laminae to be bonded. However, the entire curing process need not be carried out during such contact; in some instances an added curing agent is employed to further cure the interpolymer while in contact with one or more of the laminae.

In one type of bonding method, the laminae to be bonded are each coated with the interpolymer, which is then wholly or partially cured. The film surfaces are then pressed together, usually with heating and elevated pressure, thus forming a strong bond between the laminae. The oxidative cure provides good adhesion to the substrate and additional curing appears to take place between the adhesive layers during the pressing, possibly through oxygenated functional groups formed during the oxidative cure. This method is especially useful with metal, glass and similar laminae. Temperatures up to 500° F. or higher (depending upon the laminae) and pressures of several thousand pounds per square inch can be employed, although only moderate temperatures and pressures are usually used. In some cases, only a slightly elevated pressure and ambient temperature are sufficient.

When one or more of the laminae is permeable to air, as with open-celled foam (rubber or polyurethane), fabrics, or when lamina can be impregnated with the interpolymer, as with glass or other fibers, the interpolymer can be cured while in contact with two or more laminae, and the curing can be solely with atmospheric oxygen (although other curing agents, driers, etc. can be added if desired). In such cases, the interpolymer is applied to the laminae while uncured or only partially cured, i.e., while still tacky, and oxidative curing at ambient or elevated temperatures is carried out while the laminate is assembled. All laminae can be air-permeable, or one or more air-permeable laminae can be bonded to any type of lamina, and can be either on the surface or interposed between other laminae. Pressure can be employed if desired to assist diffusion and insure contact with oxygen.

This type of bonding method, i.e., where oxidative curing is carried out while the laminate is assembled, can also be utilized with non-permeable laminae if only one lamina is to be employed, or if sufficient edge exposure is provided. Metal to metal laminates with thin overlap joints are examples of this embodiment.

In other instances, it is not convenient to provide for oxidative curing while in contact with all laminae to be bonded. In such cases, the interpolymer can be applied to the laminae and cured in the presence of an added curing agent. Usually, the interpolymer is wholly or partially oxidatively cured prior to final assembly of the laminate, and further curing with added curing agent is carried out after assembly. During the oxidative curing, the interpolymer can be in contact with one or more of the laminae, and the oxidative curing can be carried out to whatever extent is desired. Even though the interpolymer has been oxidatively cured, sufficient functional groups remain for additional curing either with the added curing agent, or as mentioned above, without an added curing agent by pressing the film surfaces together.

The use of an added curing agent is particularly effective with rubber laminates, and in the preferred embodiments an unvulcanized rubber stock is vulcanized while in contact with the interpolymer, with the vulcanizing agent for the rubber serving as the added curing agent for the interpolymer. Extremely strong bonds and inseperable laminates are obtained in this manner.

The added curing agent can be any polyfunctional material which reacts with either residual double bonds of the interpolymer or the hydroxyl and carboxyl groups which form during the oxidative curing of the interpolymer. Examples of the former type are vulcanizing agents such as sulfur, poly-para-dinitrosobenzene, ploysulfides such at tetramethylthiuram disulfide, thiocarbanilide, mercaptobenzothiazole, antimony pentasulfide, zinc dimethyldithiocarbamate, butyraldehyde-aniline condensation products, and piperidinium pentamethylene dithiocarbamate. There can also be utilized polyfunctional thioalcohols, such as thioglycerol and reaction products of dichlorodiethylformal and an alkali polysulfide (e.g., Thiokol LP–3); peroxides, such a benzoyl peroxide, cumene hydroperoxide, and dicumyl peroxide; ethylenic materials such as divinylbenzene, allyl methacrylate, triallylcyanurate, diallyl fumurate, drying oils and unsaturated polyesters; and combinations of these. Other curing agents can also be used.

Examples of hydroxy and carboxyl reactive types are polyisocyanates such as toluene diisocyanate and polymethylene polyphenylisocyanate; polyepoxides, such as the digylcidyl ether of Bisphenol A and 3,4-epoxy-cyclohexyl - 3,4 - epoxycyclohexanecarboxylate; aminoplast resins, such as hexakis(methoxymethyl)melamine and other condensation products of formaldehyde with melamine, urea, benzoguanamine and similar compounds; phenolic resins, such as resole resins and novolak resins made from condensates of phenols (e.g. p-t-butyl phenol) with formaldehyde; and other similar materials.

The invention will be further described in conjunction with several examples demonstrating various embodiments thereof. The interpolymers employed in the examples were produced as follows:

INTERPOLYMER A

A thoroughly clean and dry reaction vessel was flushed with nitrogen gas, charged with 10 liters of benzene, and sparged with nitrogen for 15 minutes. Ethylene and propylene were passed into the solvent at a ratio of 2 volumes of propylene per volume of ethylene, with the total flow being sufficient to maintain saturation of the reaction mixture. There were added 176 milliliters of dicylopentadiene, 50.4 milliliters of biccycloheptadiene, and 20.0 milliliters of a 1.5 molar solution of ethyl aluminum sesquichloride in benzene, and then the mixture was cooled to about 5° C. and 10.0 milliliters of a 0.1 molar solution of vanadium tris(acetylacetonate) in benzene were introduced. Reaction began immediately, as shown by decrease in the off-gas rate; in 2 minutes the off-gas rate had risen and then 10 milliliters of bicycloheptadiene, 34 milliliters of dicylcopentadiene, and 10 mililiters of the vanadium tris(acetylacetonate) solution were added. Further additions of 5 milliliters of bicycloheptadiene, 17.6 milliliters of dicylopentadiene and 10 milliliters of the vanadium compound solution were made whenever the off-gas rate is increased, a total of 6 additions being made (including the initial addition). The polymerization was carried out for a total of 22 minutes from the time the first vanadium catalyst was added, after which 50 milliliters of methanol were added to the reaction mixture, and it was washed first with aqueous HCl and then washed acid-free with distilled water. The benzene was stripped at reduced pressure and replaced with about 2 liters of aromatic naphtha (boiling range 150–170° C.), and stripping was continued until the total solids content of the solution was 30.8 percent and its Gardner-Holdt viscosity was Q–R. The solution contained 279 grams of interpolymer, which by spectroscopic analysis comprised about 56 percent ethylene, 17 precent propylene and 27 percent dicylcopentadiene, all in polymerized form. The interpolymer had an intrinsic viscosity of 0.28 deciliter/gram in benzene at 25° C.

INTERPOLYMER B

The procedure empolyed in making Interpolymer A was repeated, except that an equivalent molar amount of vanadium oxybis(acetylacetonate) was employed in place of the vanadium tris(acetylacetonate), and all additions after the initial addition included 5 milliliters of bicycloheptadiene and 17.6 milliliters of dicyclopentadiene. The product solution obtained had a total solids content of 35.5 percent and a Gardner-Holdt viscosity of Z2; it contained 316 grams of interpolymer having an intrinsic viscosity in benzene at 25° C. of 0.30 deciliter/gram.

INTERPOLYMER C

A clean, dry vessel was charged with 3 liters of benzene, 140 milliliters of dicyclopentadiene, 6.5 milliliters of 4-vinylcyclohexene-1 and 1.59 milliliters of isopropyl ether. Ethylene was passed into the solution at a rate of 10 liters per minute; while maintaining the ethylene flow, 2.05 milliliters of a 1.5 molar solution of ethyl aluminum sesquichloride in benzene were first added, followed by 15 milliliters of a 0.02 molar solution of vanadium tris-acetylacetonate) in benzene. Addition of ethylene was continued for 2 minutes after the catalyst addition, with the temperature at about 27° C. The reaction was terminated by the addition of 10 milliliters of methanol, after which the reaction mixture was washed with aqueous HCl and then with distilled water until acid-free. Most of the benzene was stripped from the solution, 1 liter of aromatic naphtha was added and stripping was continued until a solution was obtained having a solids content of 15.6 percent and a Gardner-Holdt viscosity of D–E. The interpolymer had an intrinsic viscosity in benzene at 25° C. or 0.195, and nuclear magnetic resonance analysis indicated that it was made up of 79 percent polymerized dicyclopentadiene units and 21 percent polymerized ethylene units.

INTERPOLYMER D

A clean, dry reaction vessel was charged with 2 liters of dried benzene and sparged with nitrogen for 15 minutes. While passing a 1 to 1 molar ratio of ethylene and propylene into the solution, there were added 35.2 milliliters of dicyclopentadiene and 12.4 milliliters of bicycloheptadiene. The mixture was cooled to 8° C., and 1.67 milliliters of a 1.5 molar solution of ethyl aluminum sesquichloride in benzene were then added. Cooling was maintained throughout the polymerization, which was initiated by the addition of 2.0 milliliters of 0.1 molar solution of vanadium tris(acetylacetonate) in benzene. Polymerization began immediately, as evidenced by a rise in the temperature and absorption of the gases passing into the solution. Reaction conditions were maintained for 5 minutes after the addition of the vanadium compound, after which the reaction was terminated by the addition of 25 milliliters of methanol; the reaction mixture was then washed with 5 milliliters per liter of concentrated HCl and then washed with distilled water until acid-free. From the washed reaction mixture most of the benzene was removed by evaporation at reduced pressure at room temperature or below, about 2 liters of aromatic naphtha were added and stripping was continued until the solution had a solids content of 28.1 percent and a Gardner-Holdt viscosity of N. There were obtained 28.5 grams of interpolymer having an intrinsic viscosity (in benzene at 25° C.) of 0.23 deciliter/gram.

INTERPOLYMER E

An ethylene-dicyclopentadiene copolymer was prepared using essentially the same procedure as that employed in making Interpolymer D, except that no propylene was employed, vanadium oxybis(acetylacetonate) was employed as the catalyst in equivalent amount, and the concentration of bicycloheptadiene was 0.05 mole per liter. The product solution had a solids content of 19.2 percent, a Gardner-Holdt viscosity of D, and contained 27.3 grams of interpolymer, having an intrinsic viscosity of 0.18 deciliter/gram (in benzene at 25° C.).

INTERPOLYMER F

A clean and dry reaction vessel was flushed with nitrogen gas, charged with 10 liters of benzene, and sparged with nitrogen for 15 minutes. A 1 to 2 volume ratio of ethylene and propylene was passed into the solvent at a total rate sufficient to maintain saturation of the reaction mixture. There were added 190 milliliters of dicyclopentadiene and 21.5 milliliters of a 1.4 molar solution of ethyl aluminum sesquichloride in benzene, and then while maintaining the temperature at about 6° C., 50 milliliters of a 0.02 molar solution of vanadium oxybis(acetylacetonate) in benzene were introduced. The off-gas rate dropped and the ethylene and propylene rates were increased; in 1 minute the off-gas rate again rose and an addition was made of 19 milliliters of dicyclopentadiene and 50 milliliters of the vanadium oxybis(acetylacetonate) solution. The above addition was again made after the off-gas rate had increased, and this was repeated for a total of 6 additions. After the sixth addition, and the reaction had ceased, a further addition of catalyst alone was made. The polymerization was carried out for a total of 38 minutes from the time of the first vanadium catalyst addition. The reaction was terminated by adding 100 milliliters of methanol, after which the reaction mixture was washed with aqueous HCl and then washed acid-free with distilled water. The benzene was stripped at reduced pressure, replaced with about 2 liters of aromatic naphtha, and stripping continued until the viscosity of the solution was Z1 (Gardner-Holdt). There were obtained 1345 grams of solution having a solids content of 26.6 percent. The interpolymer contained 43 percent ethylene, 27 percent propylene and 30 percent dicyclopentadiene (infra-red and NMR analysis) and had an intrinsic viscosity of 0.53 deciliter/gram (benzene at 25° C.).

INTERPOLYMER G

An interpolymer was produced as in Interpolymer C, except that the 4-vinylcyclohexene-1 was omitted and the concentration of dicyclopentadiene in the reaction mixture was 0.3 mole per liter. The product obtained had a solids content of 23.7 percent and a Gardner-Holdt viscosity of X+, and the intrinsic viscosity of the interpolymer produced was 0.37 deciliter/gram (in benzene at 25° C.).

Below are several examples illustrating the laminates of the invention and the methods by which they are obtained. It will be understood that these examples are illustrative only and are not intended to limit the invention to their details.

In Examples 1 to 10, there are described laminates of rubber to various materials. In these examples there are utilized several types of rubber stocks, made in accordance with conventional commercial practice. The styrene-butadiene rubber stock (SBR) is known as U.S. Rubber 6330, and the natural rubber stock is known as Firestone A–5426. The EPT rubber stock was made from an ethylene-propylene-aliphatic non-conjugated diene terpolymer rubber such as described in U.S. Patent No. 2,933,480;

"Nordel 1040" is a commercial example. The rubber stock has the following composition:

| | Parts by weight |
|---|---|
| Ethylene - propylene - 1,4 - hexadiene terpolymer, Mooney viscosity 40 at 250° F. | 100 |
| Carbon black (FEF, Philblack A) | 60 |
| Zinc oxide | 5.0 |
| Stearic acid | 1.0 |
| Naphthenic petroleum oil (specific gravity 9.9843; Circosol 596) | 20.0 |
| Sulfur | 1.5 |
| 2-Mercaptobenzothiazole | 0.5 |
| Tetramethylthiuram monosulfide | 1.5 | laminated to the coated steel at a temperature of 320° F. for 30 minutes and an initial pressure of 1400 p.s.i. When tested as in Example 1, the yield point was 26.5 pounds. Another laminate, made in the same manner except that the laminate was retained in the laminating press for 16 hours, had a yield point of 44 pounds.

EXAMPLES 3 TO 10

In these examples, several types of rubber stocks were tested as above, with several different interpolymers on both steel and glass plates. The tests were carried out as in Example 1 above. The data are shown in Table I.

TABLE I.—EXAMPLE 3-10

| Example | Rubber Stock | Interpolymer | Film Cure | | Vulcanization | | | Substrate | Instron Yield Point (lbs.) |
|---|---|---|---|---|---|---|---|---|---|
| | | | Time (min.) | Temp. (° F.) | Time (min.) | Temp. (° F.) | Press. (p.s.i.) | | |
| 3 | Natural | B | 30 | 300 | 30 | 275 | 1,400 | Glass | 4.9 |
| 4 | Polyisoprene | A | 30 | 300 | 25 | 300 | 1,400 | do | 9.3 |
| 5 | Polybutadiene | A | 30 | 300 | 35 | 300 | 1,400 | Steel | 8-10 |
| 6 | SBR | B | 5 | 300 | 20 | 300 | 1,400 | Glass | 17.5 |
| 7 | SBR | B | 30 | 300 | 20 | 300 | 1,400 | Glass [1] | 12.0 |
| 8 | SBR | B [2] | 30 | 300 | 20 | 300 | 1,400 | do [1] | 17.0 |
| 9 | SBR | E | 30 | 300 | 20 | 300 | 1,400 | do | 11 |
| 10 | SBR | F | 30 | 300 | 30 | 300 | 1,400 | do | 4 |

[1] Sized with vinyl triethoxysilane.
[2] 17.1 percent (based on solids) of trimethylolpropane tris(3-mercaptopropionate) added.

The polybutadiene rubber stock has the following composition:

| | Parts by weight |
|---|---|
| Cis-polybutadiene rubber (Ameripol CB-220) | 100 |
| Carbon black (high abrasion furnace black) | 50 |
| Zinc oxide | 3.0 |
| Stearic acid | 2.0 |
| Oil-soluble, non-heat-reactive alkyl phenol novolak resin (Catalin Resin 8318) | 5.0 |
| Hydrogenated rosin (Staybelite resin) | 5.0 |
| Sulfur | 1.4 |
| N-t-butyl-2-benzothiazole sulfenamide | 1.2 |

The polyisoprene rubber stock has the following composition:

| | Parts by weight |
|---|---|
| Polyisoprene (Natsyn 200) | 100 |
| Carbon black (high abrasion furnace black) | 45 |
| Zinc oxide | 3.0 |
| Stearic acid | 2.0 |
| Pine tar | 5.0 |
| Diarylphenylenediamine (Wing Stay 100) | 0.75 |
| N-t-butyl-2-benzothiazole sulfenamide | 0.4 |
| Sulfur | 2.25 |

EXAMPLE 1

A clean steel panel was coated with a 3 mil wet film of Interpolymer A, which was then baked at 300° F. for 30 minutes. A strip of the EPT rubber stock above, 7¼" x ½" by ¼", was placed on the film and the assembly was cured at 320° F. and 180 p.s.i. pressure for 30 minutes. The adhesion of the rubber to the steel was then tested by pulling the rubber from the substrate at a 90° angle on an Instron tester, using a maximum load of 50 pounds and a pull rate of 10 inches per minute. The yield points on 2 samples were 27.5 and 37 pounds, respectively, demonstrating excellent strength between the laminae. (The term "yield point" is used to refer to the load at which initial loss of adhesion occurs.) During the test the rubber had begun to tear, demonstrating that the adhesive strength between the laminae approached or exceeded the cohesive strength of the rubber.

EXAMPLE 2

Example 1 was repeated using a 7 mil wet film of Interpolymer C. A 1" by 7" strip of the rubber stock was Examples 11 and 12 illustrate the use of foam rubber making laminates in accordance with the invention.

EXAMPLE 11

Interpolymer B was reduced with toluene to a solids content of 25 percent, and the 5 mil wet films were drawn on glass plates and let dry for 15 minutes. Carbon black-filled rubber foam strips (of the automobile molding type) were then pressed onto the film using hand pressure and the film cured. One laminate was air-dried at room temperature for 68 hours and another was cured for 60 minutes at 175° F. The laminates obtained were in both instances quite strong, with no appreciable difference being noted between that which was baked and that which was air-dried. In each instance, the foam rubber could only be removed with some accompanying tearing of the rubber.

EXAMPLE 12

Example 11 was repeated using unfilled furniture cushion type rubber foam. Again, no differences were noted between the baked and unbaked laminates, and the foam in these cases tore completely before it could be removed from the adhesive.

Examples 13 to 15 illustrate a highly desirable embodiment of the invention in which the interpolymers therein are employed to adhere plies of the same or different rubbers to each other. In these examples, the EPT rubber and natural rubber stocks were those described above. The SBR rubber stock had the following formula:

| | Parts by weight |
|---|---|
| Butadiene-styrene rubber (SBR No. 1500, containing 23.5 percent styrene) | 100 |
| Carbon black (high abrasion furnace black) | 50 |
| Aromatic petroleum oil (specific gravity 0.9834, Sundex 53) | 5.0 |
| Zinc oxide | 3.0 |
| Stearic acid | 1.5 |
| Mercaptobenzothiazole disulfide | 1.75 |
| Sulfur | 2.0 |

EXAMPLE 13

Strips of the EPT rubber and natural rubber stocks about 6" by 3" were each coated with a 3 mil wet film of Interpolymer A and allowed to air dry at room temperature for 24 hours. The coated sides of the strips were then placed together in a laminating press at 300° F. and an initial pressure of 1400 p.s.i. and laminated for 45 minutes. The laminate obtained had good adhesion between the laminae, although the EPT rubber strip appeared to have absorbed some of the interlayer. A control sample of the same rubber strips laminated to each other in the same manner but without the adhesive interlayer, could be easily separated by hand and had practically no adhesion between the laminae.

EXAMPLE 14

Example 13 was repeated, except that the film on each strip of rubber stock was cured at 150° F. for 45 minutes prior to lamination. The adhesion obtained was comparable to that in Example 13, but the laminate was more uniform.

EXAMPLE 15

Using the procedure of Example 13, the EPT rubber stock was laminated to the SBR rubber stock described above. The laminate obtained had outstanding properties and could not be separated; it appeared to be one homogeneous mass. By comparison, a laminate made in the same way but without the adhesive interlayer could be easily pulled apart by hand.

EXAMPLE 16

Example 15 was repeated except that the coated rubber stock strips were cured at 150° F. for 45 minutes prior to lamination. The laminate obtained was similar to that obtained in Example 15, and again had excellent adhesion between the laminae.

The foregoing examples relate to laminates in which one or more of the laminae is rubber, these constituting many of the especially desirable laminates of the invention. However, the invention is also applicable to the preparation of laminates containing other types of laminae useful for various purposes. The following examples illustrate a number of such laminates.

EXAMPLE 17

A glass cloth was impregnated with Interpolymer G and placed between steel panels after allowing most of the solvent to evaporate. This assembly was then cured at 125° F. for 15 minutes. The tensile strength of the laminate obtained was tested on a Tinius-Olsen apparatus, and the laminate was also tested on an Instron tester as above. The tensile strength of the laminate was 16.3 p.s.i. and its Instron yield point was 41.3 pounds.

EXAMPLE 18

A 4 mil wet film of Interpolymer A was drawn on a clean steel panel. The film was allowed to dry for 15 minutes and then two cellular glass blocks 2" by 1" by ½" (cellular glass is described in U.S. Patent No. 2,123,536) were pressed onto the film using hand pressure, and the laminate was then cured at 300° F. for 30 minutes. The cellular glass had excellent adhesion to the steel.

EXAMPLE 19

A 4 mil wet film of Interpolymer A was drawn on a steel strip 1" wide. After air drying the film at room temperature for 15 minutes, a 1" by ½" by ¼" cellular glass block was pressed onto the film and baked at 300° F. for 30 minutes. A similar film was then drawn on a second steel strip and the cellular glass surface of the first laminate was placed thereon and this assembly was also cured at 300° F. for 30 minutes. There was thus produced an overlap joint between the two metal strips, with the cellular glass interposed between the strips. The laminated joint could not be separated without breaking the cellular glass.

EXAMPLE 20

One surface of a 15" by 7" by 1½" concrete block was cleaned with water and acetone and dried at 165° F. After cooling, a 4 mil wet film of Interpolymer A was drawn down on the concrete surface and allowed to dry for 15 minutes. Three cellular glass blocks, each 2" by 1" by ½", were pressed onto the film and the laminate then cured at 300° F. for 30 minutes. Good adhesion of the cellular glass to the concrete was obtained, sufficient to permit lifting of the entire laminate, which weighed over 15 pounds, by holding one of the cellular glass blocks.

EXAMPLE 21

Example 20 was repeated except that the laminate was cured at room temperature for 72 hours. Good adhesion of the cellular glass to the concrete was again obtained.

EXAMPLE 22

A 3.5 mil wet film of Interpolymer D was drawn on a clean steel plate. A paper honeycomb was then placed on top of the film and the film allowed to dry at room temperature. A similar film was drawn on a second steel panel and the honeycomb placed onto this film to form a sandwich. The assembly remained at room temperature for 2 days and then was baked at 175° F. for 2 hours. The paper honeycomb had excellent adhesion to both plates and the laminate could not be separated without tearing the honeycomb.

EXAMPLE 23

Three mil wet films of Interpolymer B were drawn on several phosphatized steel panels (Bonderite 1000) and poly(tetrafluoroethylene) panels (Teflon), and each was air-dried at room temperature for 15 minutes. Laminates were prepared by hand-pressing various materials onto these panels. After curing at room temperature (about 77° F.) for 120 hours, the laminates all showed fair to good adhesive qualities, with the results obtained being shown in Table II.

TABLE II.—ADHESION OF VARIOUS MATERIALS

| | Bonderite | Teflon |
|---|---|---|
| Flexible polyurethane foam | Good | Good. |
| Cotton gauze | do | Fair. |
| Filter paper | do | Do. |
| Asbsetos | do | Do. |
| Glass fiber mat | do | Do. |
| Glass fiber cloth | do | Do. |

EXAMPLE 24

Several pairs of steel strips 1" wide were coated with a 3 mil wet film of Interpolymer A. The solvent was allowed to evaporate for 15 minutes, and then the coated strips were hand-pressed together using a ½" overlap joint. One pair was allowed to cure in air at room temperature for 120 hours, and another was baked for 30 minutes at 300° F. The air-dried laminate had a tensile strength of 12.5 p.s.i., and the baked laminate had a tensile strength of 23.4 p.s.i.

EXAMPLE 25

Steel strips were bonded as in Example 22, using a mixture of 5.9 parts of Interpolymer A (30.8 percent solids) an 0.49 part of trimethylolpropane tris(3-mercaptopropionate). All the solvent was allowed to evaporate, then the strips were joined, with a ½" overlap joint, and baked for 30 minutes at 300° F. The resulting laminate had a tensile strength of more than 25 p.s.i.

EXAMPLE 26

Two phosphatized steel panels (Bonderite 1000) were each coated with a 3.5 mil wet film of Interpolymer D and the films were cured at 300° F. for 30 minutes. The coated panels were cut in 1-inch wide strips and the cured film surfaces were joined with a 1" overlap joint and pressed together for 30 minutes at 300° F. and 1400 p.s.i. initial pressure. The laminate obtained had good adhesion; two samples of such a laminate had tensile strengths of 140 p.s.i. and 168 p.s.i.

The examples above demonstrate the versatility of the interpolymers of the class described in producing laminates of various type, usable for varied purposes. In addition to those exemplified, laminates can be produced by

What is claimed is:

1. A laminate comprising a plurality of laminae bonded together with an oxidatively cured adhesive layer of a non-rubbery interpolymer of a cyclic polyene and at least one alpha monoolefin, said interpolymer having an essentially saturated carbon chain containing a substantial proportion of the total carbon atoms in the polymer molecule and having prior to curing at least about 3 percent ethylenically unsaturated groups in the polymer molecule and an intrinsic viscosity of 0.6 or lower in benzene at 25° C.

2. The laminate of claim 1 in which at least one of said monoolefin is ethylene.

3. The laminate of claim 1 in which said interpolymer is a copolymer of ethylene and a non-conjugated cyclic diene.

4. The laminate of claim 3 in which said diene is dicyclopentadiene.

5. The laminate of claim 1 in which said interpolymer is an interpolymer of ethylene, at least one other alpha monoolefin having more than two carbon atoms in the molecule and a non-conjugated cyclic diene.

6. The laminate of claim 5 in which said other monoolefin is propylene and said diene is dicyclopentadiene.

7. The laminate of claim 1 in which at least one of the laminae is permeable to air.

8. The laminate of claim 7 in which the permeable lamina is an organic foam.

9. The laminate of claim 8 in which said foam is rubber foam.

10. The laminate of claim 8 in which said foam is polyurethane foam.

11. The laminate of claim 1 in which at least one of the laminae is rubber.

12. The laminate of claim 11 in which said rubber is an ethylene-propylene-diene terpolymer rubber.

13. The laminate of claim 1 in which a first lamina is ethylene-propylene-diene terpolymer rubber and a second lamina is a different type of rubber.

14. The laminate of claim 13 in which the second lamina is styrene-butadiene rubber.

15. The laminate of claim 1 in which at least one of said laminae is metal.

16. The laminate of claim 1 in which at least one of said laminae is paper.

17. The laminate of claim 1 in which at least one of said laminae is glass.

18. The laminate of claim 17 in which rubber is bonded to said glass.

19. The laminate of claim 17 in which said glass is in the form of glass fibers.

20. The laminate of claim 17 in which said glass is cellular glass.

21. A method of bonding which comprises oxidatively curing with atmospheric oxygen a layer of an adhesive composition in contact with a plurality of laminae, said adhesive composition comprising a non-rubbery interpolymer of a non-conjugated cyclic diene and at least one alpha monoolefin, at least one of said monoolefins being ethylene, said interpolymer having an essentially saturated carbon chain containing a substantial proportion of the total carbon atoms in the polymer molecule and having at least about 3 percent ethylenically unsaturated groups in the polymer molecule and an intrinsic viscosity of 0.6 or less in benzene at 25° C.

22. The method of claim 21 in which at least one of said laminae is permeable to air.

23. The method of claim 21 in which at least one of said laminae is comprised of glass fibers.

24. A method of bonding which comprises:
(1) applying to a plurality of laminae a layer of an adhesive composition comprising a non-rubbery interpolymer of a non-conjugated cyclic diene and at least one alpha monoolefin, at least one of said monoolefins being ethylene, said interpolymer having an essentially saturated carbon chain containing a substantial proportion of the total carbon atoms in the polymer molecule and having at least about 3 percent ethylenically unsaturated groups in the polymer molecule and an intrinsic viscosity of 0.6 or less in benzene at 25° C;
(2) partially curing said adhesive composition with atmospheric oxygen; and
(3) joining the layers of said adhesive composition to each other under elevated pressure and completing the cure of the adhesive with atmospheric oxygen.

25. The method of claim 24 in which step 3 is carried out at an elevated temperature.

26. The method of claim 24 in which at least one of said laminae is metal.

27. A method of bonding which comprises:
(1) applying to a substrate a layer of an adhesive composition comprising a non-rubbery interpolymer of a non-conjugated cyclic diene and at least one alpha monoolefin, at least one of said monoolefins being ethylene, said interpolymer having an essentially saturated carbon chain containing a substantial proportion of the total carbon atoms in the polymer molecule and having ethylenically unsaturated groups in the polymer molecule and an intrinsic viscosity of 0.6 or less in benzene at 25° C;
(2) partially curing said adhesive composition with atmospheric oxygen; and
(3) contacting the partially cured layer of said adhesive composition with a lamina in the presence of an added curing agent and completing the cure of the adhesive.

28. The method of claim 27 in which said lamina is rubber.

29. The method of claim 28 in which the added curing agent is a vulcanizing agent for said rubber.

30. The method of claim 28 in which said rubber is ethylene-propylene-diene terpolymer rubber.

31. The method of claim 28 in which said rubber is styrene-butadiene rubber.

32. The method of claim 27 in which said substrate is a first type of rubber and said lamina is a second type of rubber.

33. The method of claim 32 in which one of said rubbers is ethylene-propylene-diene terpolymer rubber.

34. The method of claim 27 in which said substrate is glass and said lamina is rubber.

35. The method of claim 34 in which said glass is in the form of glass fibers.

References Cited

UNITED STATES PATENTS

| | | | |
|---|---|---|---|
| 3,000,772 | 9/1961 | Lunn | 161—203 |
| 3,000,866 | 9/1961 | Tarney | 260—80.78 |
| 3,179,554 | 4/1965 | Gladding et al. | 156—334 |
| 3,241,592 | 3/1966 | Sneary | 156—334 |
| 3,269,444 | 8/1966 | Willis | 161—217 |
| 3,342,769 | 9/1967 | Souffie | 260—80.78 |
| 3,364,155 | 1/1968 | Souffie | 260—80.78 |

ROBERT F. BURNETT, Primary Examiner

WILLIAM J. VAN BALEN, Assistant Examiner

U.S. Cl. X.R.

156—334; 161—68, 93, 161, 203, 205, 208, 217, 250, 260—80.78, 88.2